Oct. 13, 1936.  H. Y. EDGERTON  2,057,564

FRUIT JUICE EXTRACTOR

Filed Nov. 16, 1934

Inventor
H. Y. Edgerton,
Havell & Havell
By
Attorneys

Patented Oct. 13, 1936

2,057,564

UNITED STATES PATENT OFFICE 2,057,564

FRUIT JUICE EXTRACTOR

Henry Yates Edgerton, Alexandria, Va.

Application November 16, 1934, Serial No. 753,374

3 Claims. (Cl. 146—3)

The object of the invention is to provide an extractor for citrus fruit juices, replacing the conventional dangerous rotating reamer with one having an oscillatory movement. A revolving reamer tends to pull the fruit from the hand and on innumerable occasions dangerous accidents have occurred in retrieving the fruit. The oscillating reamer eliminates this danger hazard by allowing a firm grip at all times to be had upon the fruit, which is not possible when a revolving reamer is used.

A further object of the invention is to permit the maximum amount of juice to be extracted which cannot be accomplished by a constantly revolving reamer since the same tends to continuously pull the pulp in one direction and to pack it against the fruit rind, thereby impounding a portion of the juice in the mass. Moreover, a continuously revolving reamer pulls stringy portions of the pulp from the rind and discharges them into the extracted juice. On the other hand, an oscillating reamer combs the stringy portions back and forth, thereby allowing the maximum amount of juice to be extracted and minimizes the amount of pulp that is discharged into the strainer, thereby giving the strainer greater capacity when used in combination with an oscillating reamer than when used with a constantly rotating reamer.

A further object of the invention is to prevent packing of the pulp into the recess between the ribs or other projections of the reamer. This is a great objection to constantly rotating reamers, avoided by changing periodically the direction of movement of the reamer and thereby preventing the pulp from becoming firmly packed in the recesses of the reamer and difficult to be removed when cleaning after its period of run.

A still further object of the invention is to cause aeration and fluffing of the extracted juice by entraining air therein coincident with the centrifugal separation or straining of the pulp and seeds from the juice.

Figure 1:
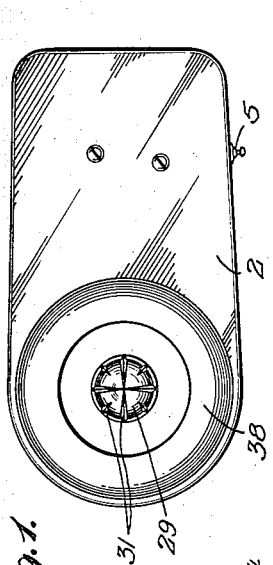
Figure 2:
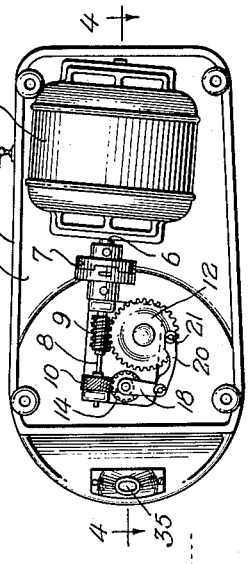
Figure 3:
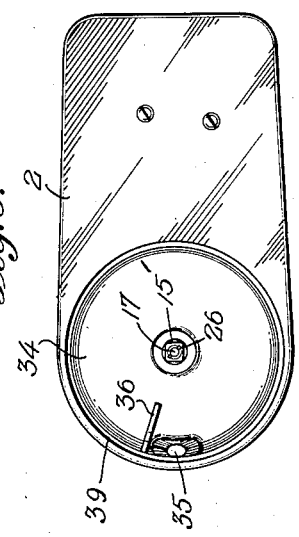
Figure 4:
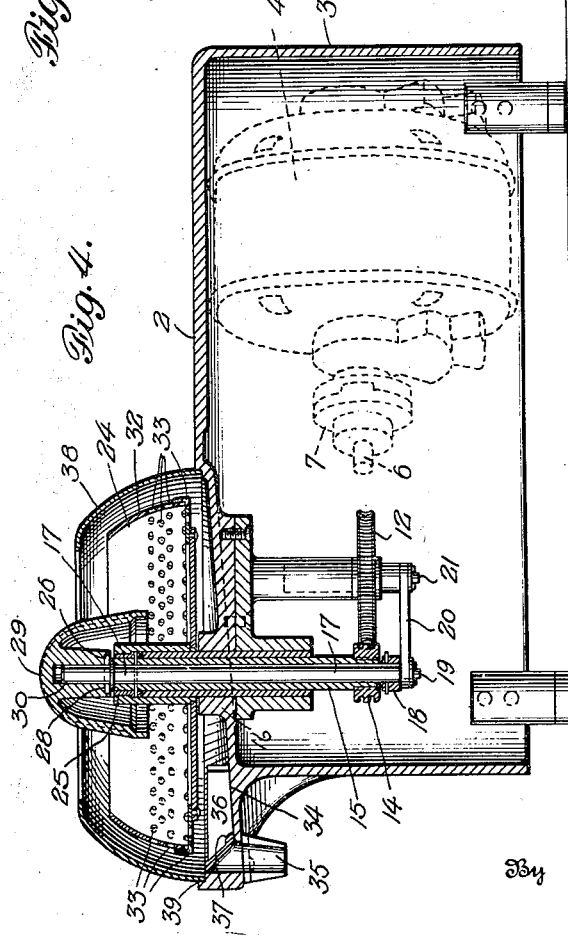
Figure 5:
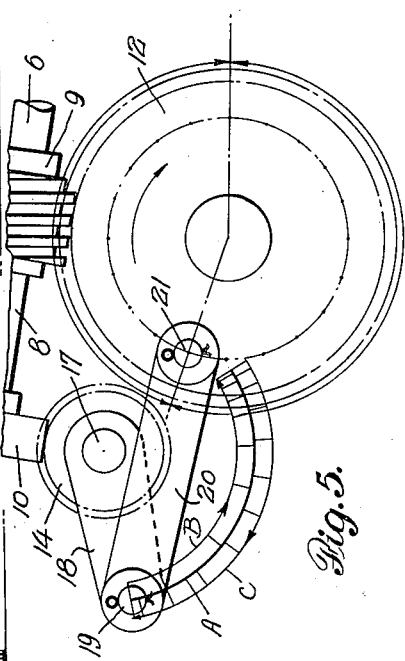

With the above and other objects in view, reference will be had to the accompanying drawing forming a part of this specification, and wherein Fig. 1 is a top plan view of the invention, Fig. 2 is a bottom plan view of the invention, Fig. 3 is a view similar to Fig. 1 with parts removed, Fig. 4 is an enlarged longitudinal sectional view taken on line 4—4 of Fig. 2 with the motor and drive shaft shown diagrammatically in dotted lines, and the shaft broken away, and Fig. 5 is a diagrammatical view of the operating gearing.

In the drawing, reference numeral 2 designates a table having skirt 3 and which houses an electric motor 4 rigidly secured therein and having a switch 5 in circuit therewith. The motor shaft 6 is connected by separable coupling 7 with a shaft 8 suitably journaled in the lower side of the table 2. Fixed to or formed on the shaft 8 is a worm gear 9 and a terminal spiral gear 10. The worm gear 9 meshes with a worm pinion 12 and the spiral gear 10 meshes with a spiral gear 14.

The gear 14 is attached to a hollow shaft 15 journaled in a hub 16 extending upwardly from the upper side of the table 2. A reamer shaft 17 extends through the bore of shaft 15 and at its lower end is provided with a lever 18 having pivotal connection at 19 with a link 20 which latter in turn has pivotal connection at 21 with a wrist pin on worm pinion 12.

The upper end of shaft 15 is squared at 15' above the hub 16 and a centrifugal separator or strainer basket 24 has a squared central bore 25 engaged therewith. A cross pin 26 is provided on the shaft 17 and engages in a cross slot 28 of a reamer 29, the latter having a central bore 30 to receive the shaft 17. The reamer is of conventional bilged cone shape and is provided with usual long and short external ribs 31. The basket has an upwardly and inwardly extending marginal flange 32 and the flange 32 as well as the base of the basket has strainer perforations 33.

The table 2 is provided with a well of larger diameter than the basket 24 and the same has a sloping bottom 34 leading to a discharge passage located substantially outside the vertical plane of the basket. A baffle 36 is provided adjacent the opening into the passage to prevent the extracted juice from whirlpooling and to cause it to flow into the discharge passage 35. A small port 37 is provided in the baffle to permit the juice on the far side of the same to backflow into the discharge passage. The baffle also serves to deflect the air stream into the discharge along with the juice as will be later described.

A circular guard 38 is received in an annular seat 39 surrounding the well and extends upwardly and inwardly therefrom, with substantially equal spacing from the flange 32 of the basket, but being of a greater heighth than the latter. The upper edge of the guard is spaced from the reamer a distance insufficient to permit entry of an operator's hand into the guard or basket in a manner to permit injury thereto.

In the example, the gear ratio is such that a motor turning at 1600 R. P. M. the basket shaft and the basket itself have the same rate of constant rotation, while the reamer is caused to have 160 oscillatory movements, 80 in one direction and 80 alternately in the opposite direction. This is produced by having the worm pinion rotate clockwise (in the diagram), once for every twenty rotations of the worm 9 of the motor shaft line. Starting with the parts in the positions illustrated in Fig. 5, upon clockwise movement of the worm pinion 12, the sweep of the pivot point 19 will follow the arcuate line A. The offset arcuate line B represents the stroke to the right and the arcuate line C represents the stroke to the left. These are marked with intersecting lines that indicate the positions of the pivotal point 17 at the end of each revolution of the worm pinion 12. The stroke to the right after one revolution of the worm pinion 12 is quite rapid and gradually diminishes toward the end of the stroke, where the worm pinion makes a number of revolutions while the wrist pin 21 is passing over dead center on the other side of the worm pinion center. The stroke to the left then starts slowly at first and gradually increasing in speed as indicated by the stroke line C.

While the motor speed in the example has been given as 1600 R. P. M., that speed is slower than would ordinarily be used since motor speeds less than 1725 R. P. M. are seldom used, and the latter speed has been found to be entirely satisfactory and gives 86 oscillations a minute of the reamer in each direction.

It is within the scope of the invention to increase or decrease the speed of the motor adopted and consequently the rate of movement of the reamer.

It will be observed that the center of the worm pinion 12, wrist pin 21, pivotal point 19 and center of the shaft 17 are never all aligned, hence there is no dead center position of the linkage to stall the mechanism.

The reamer, even when stroking in the same direction as that in which the strainer is rotating, is moving at a slower rate of speed than the strainer, substantially in the ratio of 1 to 20, and this slower reamer speed is found to be considerably more effective and less dangerous than where the reamer is turning at the same high speed required of a centrifugal strainer.

Obviously the direction of rotation of the motor may be in either direction.

In operation, half of an orange or other fruit is held upon the reamer in the usual manner and pushed downwardly upon the same in the usual manner only with the wrist elevated above the usual position due to the presence of the guard 38. The space between the upper edge of the guard and the reamer is only slightly more than is necessary to permit the passage of the fruit and the operator's fingers therebetween so that there is little danger of the hand becoming injured by the moving parts. Should a soft spot be present in the fruit permitting the reamer to pass rapidly therethrough, the operator's wrist will strike the upper edge of the guard, if it is not initially resting thereon, and prevent the hand from encountering the rapidly rotating basket and also enabling him to pry his hand away from the reamer. This, together with the fact that the reamer oscillates and has a perceptible rest period at the end of certain oscillatories, enables him to retain or to regain his grip upon the fruit, which grip would be lost and not easily regained with a constantly and rapidly rotating reamer.

The extracted juice is caught within the centrifugal strainer basket, some straining through the bottom thereof, but most of it being thrown against the flange 32 and straining through its openings. The clarified juice is then thrown centrifugally against the guard and drains into the inclined well 34 flowing with the juice that passes through the bottom of the basket through the bottom of the basket to the low part of the well. Whirlpooling will tend to set up, but this is interrupted by the baffle and the juice then discharges through the discharge passage 35.

Air sweeping over the upper edge of the guard 38 is entrained with the clarified juice thrown outwardly by the basket 32 and centrifugal pump action apparently causes air to be thrown outwardly by the basket through its perforations and this air passes along with the juice to the outlet 35 tending to sweeping the interior of the guard and bottom of the well clean and issuing in a highly perceptible stream from the discharge nozzle causing rapid discharge of the extracted juice. This air flow causes aeration and perceptible fluffing and increasing of volume of the extracted juice.

What is claimed:

1. In a fruit juice extractor, concentric shafts, a reamer on one shaft, a centrifugal strainer on the other shaft, a motor driven shaft, a gear on the strainer shaft driven from the motor shaft, a crank arm on the reamer shaft, a wrist pin carrying element operated by the motor shaft, and means linking the crank arm and wrist pin together.

2. In a fruit juice extractor, concentric shafts, a reamer on one shaft, a centrifugal strainer on the other shaft, a motor driven shaft, a gear on the strainer shaft, a gear on the motor shaft for imparting continuous rotary movement to said first mentioned gear, a crank arm on the reamer shaft, a wrist pin carrying element operated by the motor shaft and its wrist pin having a greater throw than the said crank arm, and means linking the crank arm and wrist pin together.

3. In a fruit juice extractor, a shaft within a shaft, a motor driven element, means operated by said element and having direct connection with the inner shaft to impart relatively slow oscillations thereto, means also operated by said element and having direct connection with the outer shaft to rotate the same at a relatively high rate of speed, a reamer on the inner shaft, and a strainer on the outer shaft in position to receive the extractions from the reamer, the speed at which the reamer is turned being insufficient to cause the operator to lose his hold upon the fruit while reaming the same or to injure the hand of the operator should the reamer pass through the rind of the fruit being reamed, and the rate of speed at which the strainer is turned being sufficient to effect centrifugal separation of the juice from the pulp of the extractions.

HENRY YATES EDGERTON.